United States Patent [19]

Herrick et al.

[11] Patent Number: 5,103,558

[45] Date of Patent: Apr. 14, 1992

[54] METHOD AND APPARATUS FOR MACHINING SCROLL WRAPS

[75] Inventors: Todd W. Herrick, Tecumseh; Robert A. Hawkes, Brooklyn; Estil D. Childress, Tecumseh; Donald W. Garnett, Grand Ledge, all of Mich.

[73] Assignee: Tecumseh Products Company, Tecumseh, Mich.

[21] Appl. No.: 719,810

[22] Filed: Jun. 24, 1991

Related U.S. Application Data

[63] Continuation-in-part of Ser. No. 573,247, Aug. 24, 1990, abandoned.

[51] Int. Cl.⁵ .................... B23P 15/00; B23Q 7/02
[52] U.S. Cl. .................... 29/888.022; 29/559; 409/132; 409/142; 409/166; 418/55.1
[58] Field of Search .............. 409/131, 132, 142, 165, 409/166; 29/888.022; 418/55.1, 55.2

[56] References Cited

U.S. PATENT DOCUMENTS

| | | | |
|---|---|---|---|
| 2,526,762 | 10/1950 | Miller | 90/11.44 |
| 3,492,918 | 2/1970 | Michelson | 90/11 |
| 3,552,265 | 1/1971 | Lucas | 90/14 |
| 3,604,309 | 9/1971 | Berthlez | 90/15 |
| 3,839,942 | 10/1974 | Ferchland | 29/103 |
| 4,078,415 | 7/1987 | Hirano et al. | 418/55.2 |
| 4,433,564 | 2/1984 | Fukushima et al. | 72/146 |
| 4,436,465 | 3/1984 | Fukushima et al. | 409/243 |
| 4,460,297 | 7/1984 | Kuehnle | 409/293 |
| 4,465,051 | 6/1984 | Hukuhara | 164/340 |
| 4,512,066 | 4/1985 | McCullough | 29/23.5 |
| 4,609,334 | 9/1986 | Muir et al. | 418/99 |
| 4,614,467 | 9/1986 | Takagi et al. | 409/199 |
| 4,615,091 | 10/1986 | Niwa et al. | 29/156 |
| 4,649,611 | 3/1987 | Ikeda et al. | 29/156 |
| 4,659,265 | 4/1987 | Kishi et al. | 409/132 X |
| 4,666,380 | 5/1987 | Hirano et al. | 418/55 |
| 4,696,084 | 9/1987 | Hirano et al. | 29/156 |
| 4,700,313 | 10/1987 | Takagawa | 364/474 |
| 4,720,899 | 1/1988 | Ando et al. | 29/888.022 |
| 4,726,100 | 2/1988 | Etemad et al. | 29/156 |
| 4,735,530 | 4/1988 | Dommer et al. | 409/138 |
| 4,768,904 | 9/1988 | Schmid | 409/262 |
| 4,774,746 | 10/1988 | Blaimschein | 29/26 |
| 4,893,971 | 1/1990 | Watanabe et al. | 409/80 |

Primary Examiner—Eugene F. Desmond
Attorney, Agent, or Firm—Baker & Daniels

[57] ABSTRACT

A method and apparatus for machining a matched set of fixed and orbiting scroll members for use in a scroll compressor. The respective wrap surfaces of the scroll members are simultaneously machined by respective rotating cutting tools. Specifically, rotational and linear movement of the fixed and orbiting scroll members together, synchronized with linear movement of the cutting tools, causes the simultaneous machining of the scroll members along respective wrap surfaces that form a radially inwardly moving sealing line of contact therebetween during compressor operation. Accordingly, any systemic or random deviation from a true involute form during machining of the matching of the matched scroll member set results in complementary deviations in the respective wrap surfaces, whereby a sealed relationship between the wrap surfaces is maintained at such point of deviation during compressor operation.

19 Claims, 9 Drawing Sheets

METHOD AND APPARATUS FOR MACHINING SCROLL WRAPS

This is a continuation in part of application Ser. No. 07/573,247 filed Aug. 24, 1990, now abandoned.

BACKGROUND OF THE INVENTION

The present invention relates generally to scroll compressors and, more particularly, to a method and apparatus for machining a matched set of scroll members for use in such compressors, thereby ensuring proper sealing between respective wrap surfaces of the scroll members during compressor operation.

A typical scroll compressor comprises two facing scroll members, each having an involute wrap, wherein the respective wraps interfit to define a plurality of closed compression pockets. When one of the scroll members is orbited relative to the other, the pockets decrease in volume as they travel between a radially outer suction port and a radially inner discharge port, thereby conveying and compressing the refrigerant fluid.

It is generally believed that the scroll-type compressor potentially offers quiet, efficient, and low-maintenance operation in a variety of refrigeration system applications. However, several design and manufacturing problems persist. For instance, the operating efficiency of the compressor depends upon the integrity of axial and radial sealing between the scroll members. One type of leakage that can occur is between compression pockets of the scroll compressor at those locations where the wrap walls sealingly contact each other to define the boundaries of the moving compression pockets.

The aforementioned leakage is attributable to both the extent to which the machined wrap surfaces of the scroll members exactly follow or fit one another, and the pressure of the compressed refrigerant in the compression pockets, which tends to cause slight radial separation of the scroll member. The latter problem of a separating force during compressor operation has been effectively dealt with by a variety of radial compliance mechanisms in the prior art, e.g., a conventional swing-link radial compliance mechanism. The problem of fit between the wrap surfaces relates to how the scroll members are manufactured and, more specifically, how closely their respective machined wrap surfaces follow the same true involute form so that a radially inwardly moving line of contact is maintained between the surfaces during compressor operation.

Conventional scroll machining practice has been to use a numerically controlled profiling machine, or NC machine, to cause a milling tool and a work piece to undergo relative movement according to mathematical equations descriptive of an intended or desired involute curve. In one such machining system, a two servo controlled cartesian axis machine directs a milling cutter around the involute curve. However, deviations of the milling cutter from the involute path occur due to errors in the movement of the machine caused by constantly changing forces against the two cartesian axes and time lags in the servo response of the drive motor.

Another NC machine system for manufacturing individual scroll members, disclosed in both U.S. Pat. No. 4,893,971, issued to Watanabe et al, and Japanese Laid-open Patent Publication No. 62-88507, involves the simultaneous rotation of the workpiece and linear movement of the milling tool in order to map out an involute curve. While this type of system eliminates some of the errors in movement of the machine due to changes in direction of slide members, each machine exhibits its own systemic deviations and random deviations may occur during each cycle of a particular machine.

In each of the aforementioned methods of manufacturing scroll members, fixed and orbiting scroll members are paired after they have been independently manufactured on the same or different machines. Despite theoretical matching of the complementary fixed and orbiting involute forms, and theoretical repeatability of the machining systems creating them, in practice the fixed and orbiting scroll members must be sorted in order to achieve the best possible fit. Even then, a run-in time for the compressor is often necessary in order to work off high points on the respective wrap surfaces that are not complementary.

The present invention is directed to overcoming the aforementioned problems associated with prior methods of machining scroll members for use in scroll compressors, wherein it is desired to provide a matched set of fixed and orbiting scroll members without sorting or requiring a run-in period for the compressor.

SUMMARY OF THE INVENTION

The present invention overcomes the problems and disadvantages of the prior art by providing an apparatus and method for simultaneously machining a matched set of fixed and orbiting scroll members, wherein the fixed and orbiting scroll members are simultaneously machined along respective wrap surfaces that form a radially inwardly moving sealing line of contact during compressor operations. In accordance with the machining apparatus and method of the present invention, a matched scroll member set having enhanced sealing characteristics is capable of being manufactured.

Generally, the invention provides a method and apparatus for simultaneously machining the involute wrap geometries of a pair of scroll members, wherein a pair of cutting tools move along respective wrap portions of the fixed and orbiting scroll member that will seal together along a radially inwardly moving sealing line of contact during compressor operation. Accordingly, any systemic or random deviation from a true involute form during machining of the pair of scroll members results in complementary deviations in the respective wrap surfaces, whereby a sealed relationship between the wrap surfaces is maintained at such point of deviation during compressor operation.

More specifically, the invention provides an apparatus and method whereby a pair of scroll members are held in fixed relationship to one another by a spindle that is capable of rotating the scroll members together about a rotational axis extending through the centers of their respective wrap circles. The wrap faces of the scroll members face axially outwardly in opposite directions. A pair of cutting tools are arranged to face axially inwardly toward the respective wrap faces of the scroll members. The cutting tools are capable of controlled linear movement simultaneously with the rotational and linear movement of the scroll members, thereby simultaneously cutting the matching involute scroll geometries of the fixed and orbiting scroll members.

According to one aspect of the present invention, the pair of cutting tools simultaneously cut the radially inner surface of the involute wrap of one scroll member and the radially outer surface of the involute wrap of the other scroll member at the precise location that the scroll members sealingly contact one another when operably intermeshed during compressor operation. Accordingly, the axes of the pair of cutting tools are axially offset from one another during the machining operation.

According to another aspect of the present invention, the position of the valve tip of the involute scroll geometry of a scroll member can be established by rotating the scroll member about its rotational axis to a position dependent upon the desired location of the valve tip and the diameter of the cutting tool. The cutting tool is then moved along its linear path to form a flat surface intersecting the radially inner and outer surfaces of the involute wrap. The radially outer surface of the involute wrap is then machined such that the resulting intersection between the flat surface and the radially outer surface of the involute wrap is the valve tip.

An advantage of the scroll machining system of the present invention is that it allows the simultaneous machining of a mating pair of scroll members, such that deviation from true involute form in one of the scroll members creates a compensatory deviation in the second scroll member to minimize the loss of fit during compressor operation.

Another advantage of the scroll machining system of the present invention is that the necessary run-in time for a set of scroll members used in a scroll compressor is reduced, since it is no longer necessary to work off high points on the respective wrap surfaces that are not complementary.

A further advantage of the scroll machining system of the present invention is that manufacturability of scroll compressors is improved because sorting of individual scroll members in an attempt to find substantially matched sets is no longer required.

Another advantage of the scroll machining system of the present invention is that it is capable of compensating for differences in the diameters of the pair of cutting tools, without affecting the involute machining program or the constant feed rates.

Yet another advantage of the scroll machining system of the present invention is that the location of the valve point of the involute wrap geometry may be established with only rotational movement of the scroll member and linear movement of the cutting tool, in a manner to compensate for the diameter of the cutting tool.

The invention, in one form thereof, provides an apparatus for machining the respective involute wrap faces of a complementary pair of fixed and orbiting scroll members for use in a scroll compressor. The apparatus includes a center spindle that holds the fixed and orbiting scroll members in generally axially aligned positions so that their respective involute wrap faces face axially outwardly in opposite directions. A pair of axially inwardly facing rotatable cutting tools are provided to respectively machine the involute wrap faces of the fixed and orbiting scroll members. Relative movement of the center spindle and the pair of tools is controlled to enable simultaneous machining of the involute wrap faces of the fixed and orbiting scroll member.

The invention further provides, in one form thereof, a method of machining the respective involute wrap faces of a complementary pair of fixed and orbiting scroll members for use in a scroll compressor. The fixed and orbiting scroll members are held in fixed relationship to one another so that they are axially aligned and their respective involute wrap faces face in axially opposite directions. Then the involute wrap faces of the fixed and orbiting scroll members are engaged with a respective pair of cutting tools, each of which faces a respective involute wrap face of the fixed and orbiting scroll members. The fixed and orbiting scroll members are then rotated together while, at the same time, they are moved linearly relative the pair of cutting tools.

DESCRIPTION OF THE PREFERRED EMBODIMENT

Figure 1:
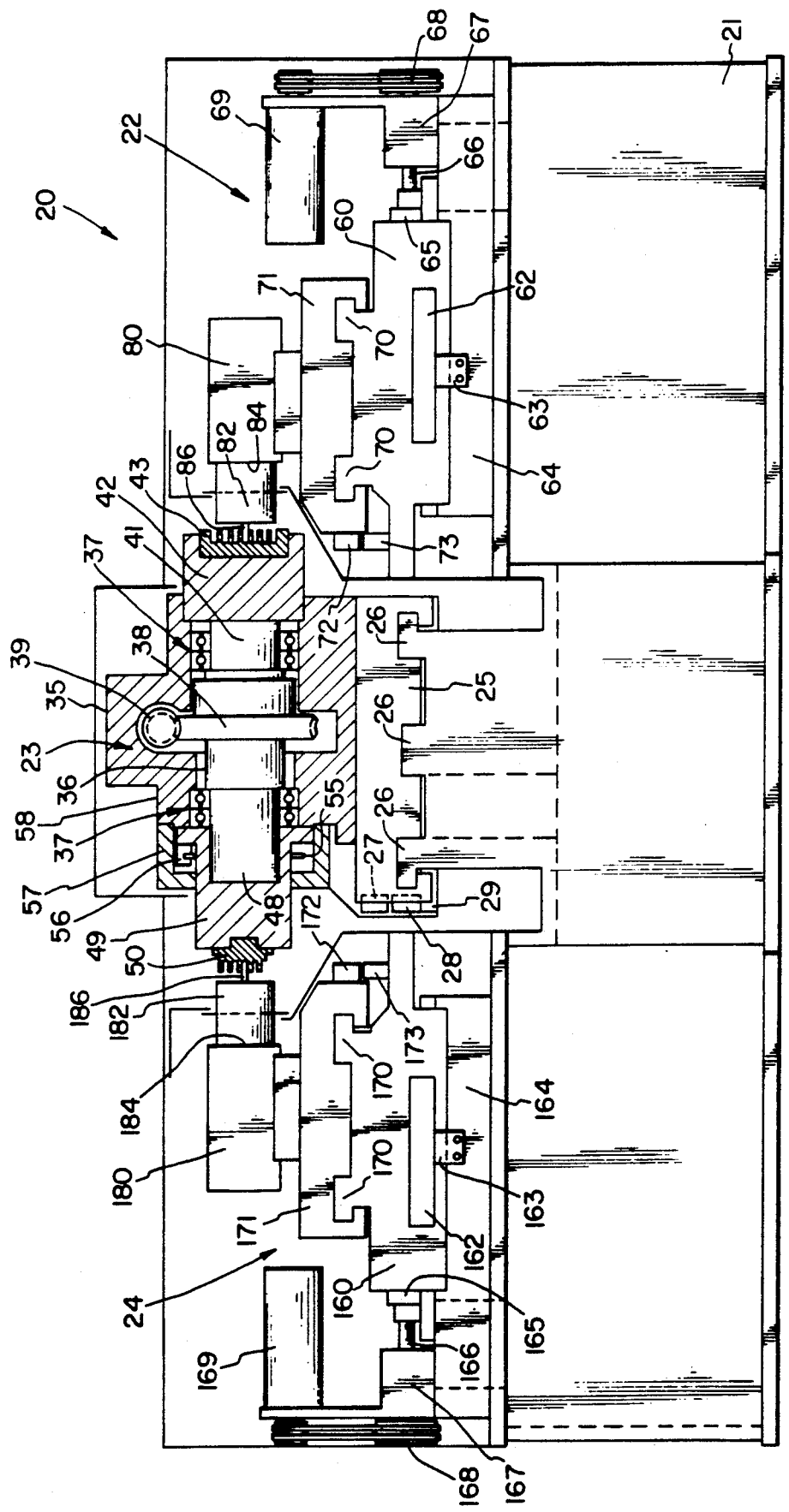
FIG. 1 is a front elevational partial sectional view of a scroll machining apparatus in accordance with the present invention.

In an exemplary embodiment of the invention as shown in the drawings, and in particular by referring to FIGS. 1-4, there is shown a machining system 100 (FIG. 4) for manufacturing a complementary matched set of fixed and orbiting scroll members in accordance with the present invention. System 100 includes a machine tool that is generally indicated by numeral 20 (FIG. 1). Machine base 21 serves as a support for a right slide system 22, center slide and rotary system 23, and left slide system 24. Center slide system 23 comprises slide 25 guided for linear motion on ways 26. A linear scale 27 is mounted to slide 25 and a stationary scale reader 28 is fixedly mounted to block 29, which in turn is bolted to base 21, to register linear position.

Figure 2:
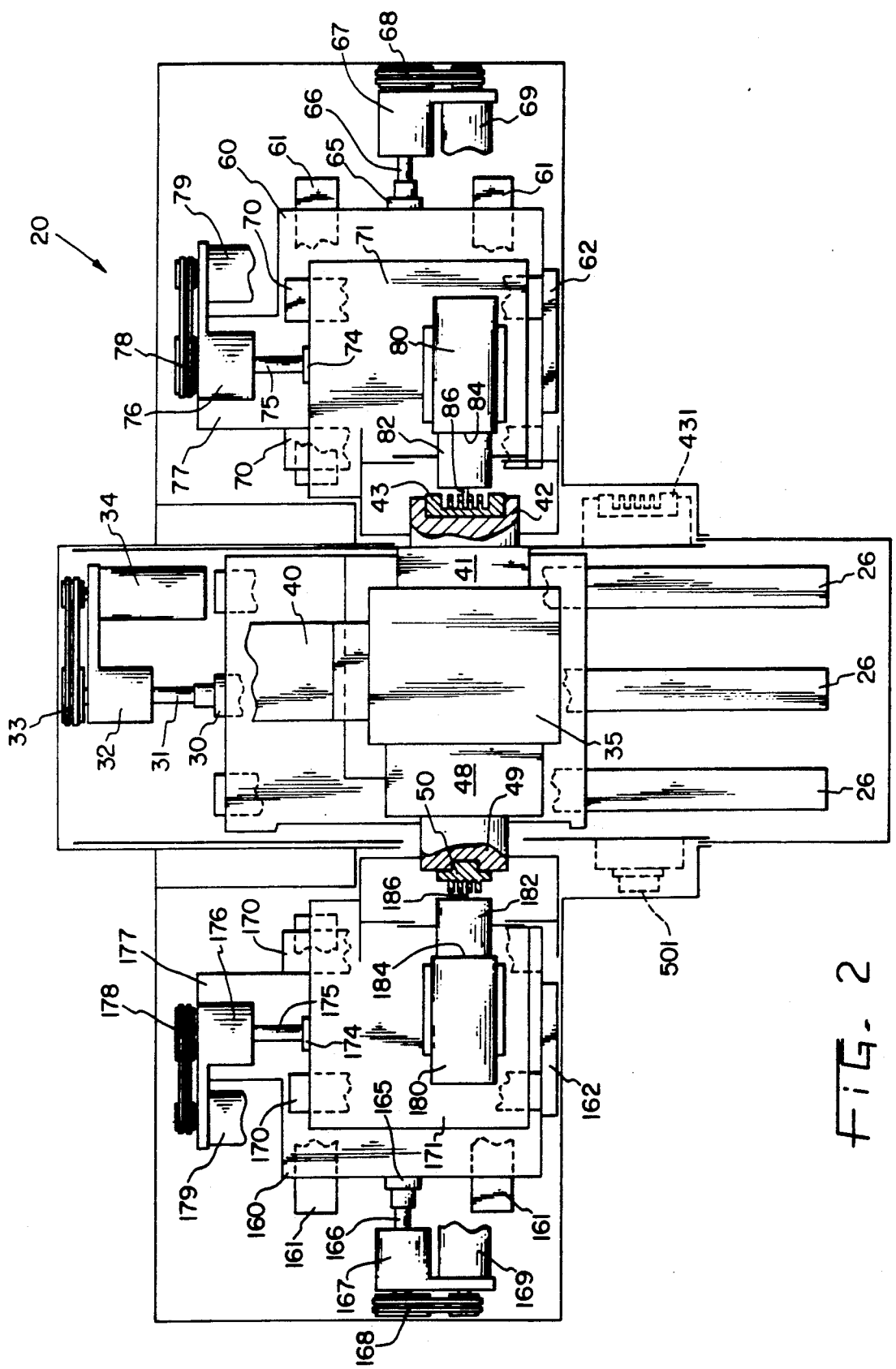
FIG. 2 is a partial sectional plan view of the scroll machining apparatus.

Referring to FIG. 2, a ball nut 30 is attached to the rear of slide 25 and provides threaded engagement with ball screw 31. Ball screw 31 is supported by combination bearing housing and motor bracket 32 for rotatable motion and restrained from linear motion. The rear end of ball screw is equipped with a belt sheave 33 and belt driven by servo motor 34. The servo motor motion is controlled by a numerical controlled controller 200 shown in FIG. 4.

Figure 3:
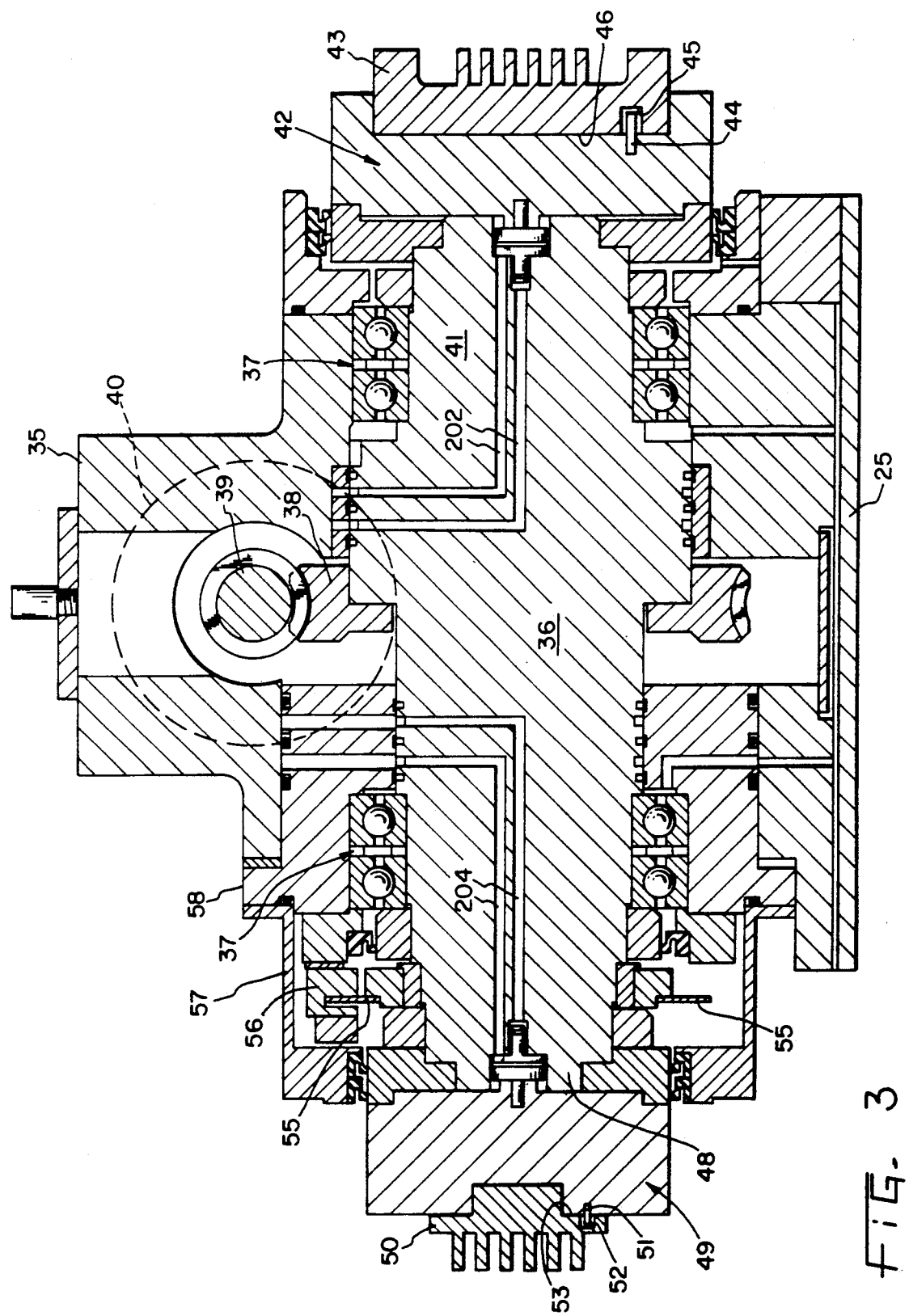
FIG. 3 is an enlarged sectional of the center spindle assembly of the scroll machining apparatus.

Referring to FIGS. 1 and 3, a rotary axis spindle 35 is mounted on and carried by slide 25. Spindle arbor 36 is carried in bearings 37 for rotary motion. Spindle arbor 3 is equipped with a worm gear 38 in driving relation with worm 39. Worm 39 is driven by servo motor 40 (FIG. 2) directly coupled to the worm. Motion of servo motor 40 is also controlled by the numerically controlled controller 200.

At end 41 of spindle arbor 36, a part chuck 42 is mounted and chucks a fixed scroll part 43 for machining. A suitable type of chuck is a Norfield Air Chuck Model #1000. The chuck is activated by air pressure supplied by air lines 202. The fixed scroll part 43 is oriented in the chuck by locator pin 44 (FIG. 3) entering a hole 45 in the rear face 46 of fixed scroll 43. Hole 45 has a known relationship to the involute form 47, 47' (FIG. 6).

At end 48 of spindle arbor 36, a part chuck 49 is mounted and chucks an orbital scroll part 50 for machining. A suitable type of chuck is a Norfield Air Chuck Model #800. The chuck is activated by air pressure supplied by air lines 204. The orbital scroll 50 is oriented in the chuck by locator pin 51 (FIG. 3) entering a hole 52 in the rear face 53 of the orbital scroll 50. Hole 52 has a known relationship to the involute form 54 and 54', and is 180° out of phase with involute form 47', 47.

Figure 6:
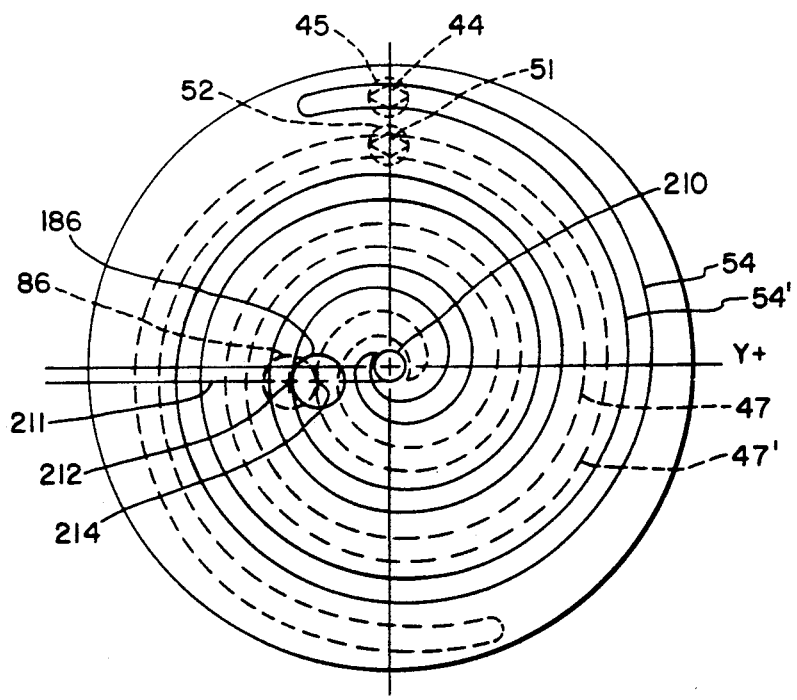
FIG. 6 is an end view of the fixed and orbiting scroll members and cutting tools of FIG. 5, wherein the involute wrap geometries are shown superimposed as they would be operably intermeshed in a scroll compressor, and also showing the cutting tools engaging a respective radially outer wrap surface of one scroll member and radially inner wrap surface of the other scroll member as the cutting tools move outwardly along the involute.
Figure 7:
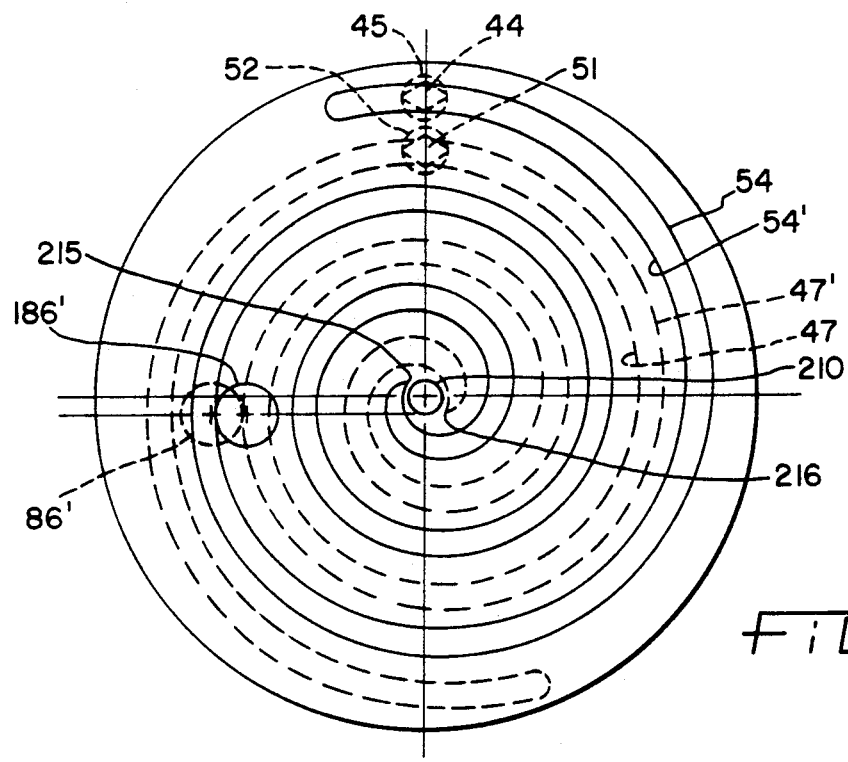
FIG. 7 is similar to the view of FIG. 6, showing the cutting tools engaged at another position along their involute path.

Involute form 54, 54' of the orbiting scroll involute, as shown in FIGS. 6 and 7 is illustrated by solid line. Involute form 47', 47 of the fixed scroll involute is shown from its back face 46 and is shown by dotted line.

As shown in FIG. 3, at an intermediate position on the spindle arbor 36, a rotary scale 55 is mounted to register rotary position. A scale reader 56 is fixedly mounted to the bearing retainer 57 which in turn is attached to housing 58 of the rotary axis spindle 35. The rotary scale 55 is a glass disk with fine lines inscribed upon it. The scale reader 56 can detect and count the number of lines that pass it and thereby determine the position of spindle arbor 36.

The right slide system 22 consists of a main slide 60 guided for linear motion on ways 61 as shown in FIG. 2. A linear scale 62 is mounted to slide 60 and a stationary scale reader 63 is mounted to base riser 64, to register linear position (FIG. 1). A ball nut 65 is attached to the rear of slide 60 and provides threaded engagement with ball screw 66. Ball screw 66 is supported by combination bearing housing and motor bracket 67 for rotatable motion and restrained from linear motion. The rear end of ball screw 66 is equipped with a belt sheave 68 and belt driven by servo motor 69. The servo motor motion is controlled by the controller 200.

The main slide 60 also provides ways 70 for linear guidance of cross slide 71. A linear scale 72 is mounted to cross slide 71 and a scale reader 73 is mounted on the main slide 60 to register linear position of the cross slide 71 in reference to main slide 60.

A ball nut 74 (FIG. 2) is attached to the rear of cross slide 71 and provides threaded engagement with ball screw 75. Ball screw 75 is supported by combination bearing housing and motor bracket 76. Bearing housing and motor bracket 76 is mounted on a rear extension 77 of main slide 60. The rear end of the ball screw 75 is equipped with a belt sheave 78 and belt driven by servo motor 79. Servo motor motion is controlled by controller 200.

The cross slide 71 mounts a motorized or driven spindle 80 which carries an end mill collet 82 on its nose 84. An end mill 86 is mounted in the collet 82.

The left slide system 24 is similar to the right slide system 22 and has similar components numbered in the hundred series:

| | |
|---|---|
| Main slide | 160 |
| Ways | 161 |
| Linear scale | 162 |
| Stationary scale reader | 163 |
| Base riser | 164 |
| Ball nut | 165 |
| Ball screw | 166 |
| Combination bearing housing and motor bracket | 167 |
| Belt sheave | 168 |
| Servo motor | 169 |
| Controller | 200 |
| Left cross slide | 171 |
| Ways | 170 |
| Linear scale | 172 |
| Scale reader | 173 |
| Ball nut | 174 |
| Ball screw | 175 |
| Combination bearing housing and motor bracket | 176 |
| Rear extension of left main slide | 177 |
| Belt sheave | 178 |
| Servo motor | 179 |
| Motorized or driven spindle | 180 |
| End mill collet | 182 |
| Spindle nose | 184 |
| End mill | 186 |

Referring to FIG. 2, center slide 25, generally perpendicular to the axes of the end mills 86, 186, is provided with a long forward stroke which can place scroll 43 in phantom position 43' and scroll 50 in phantom position 50'. This allows an operator to insert the parts to be milled into the machine.

Figure 4:
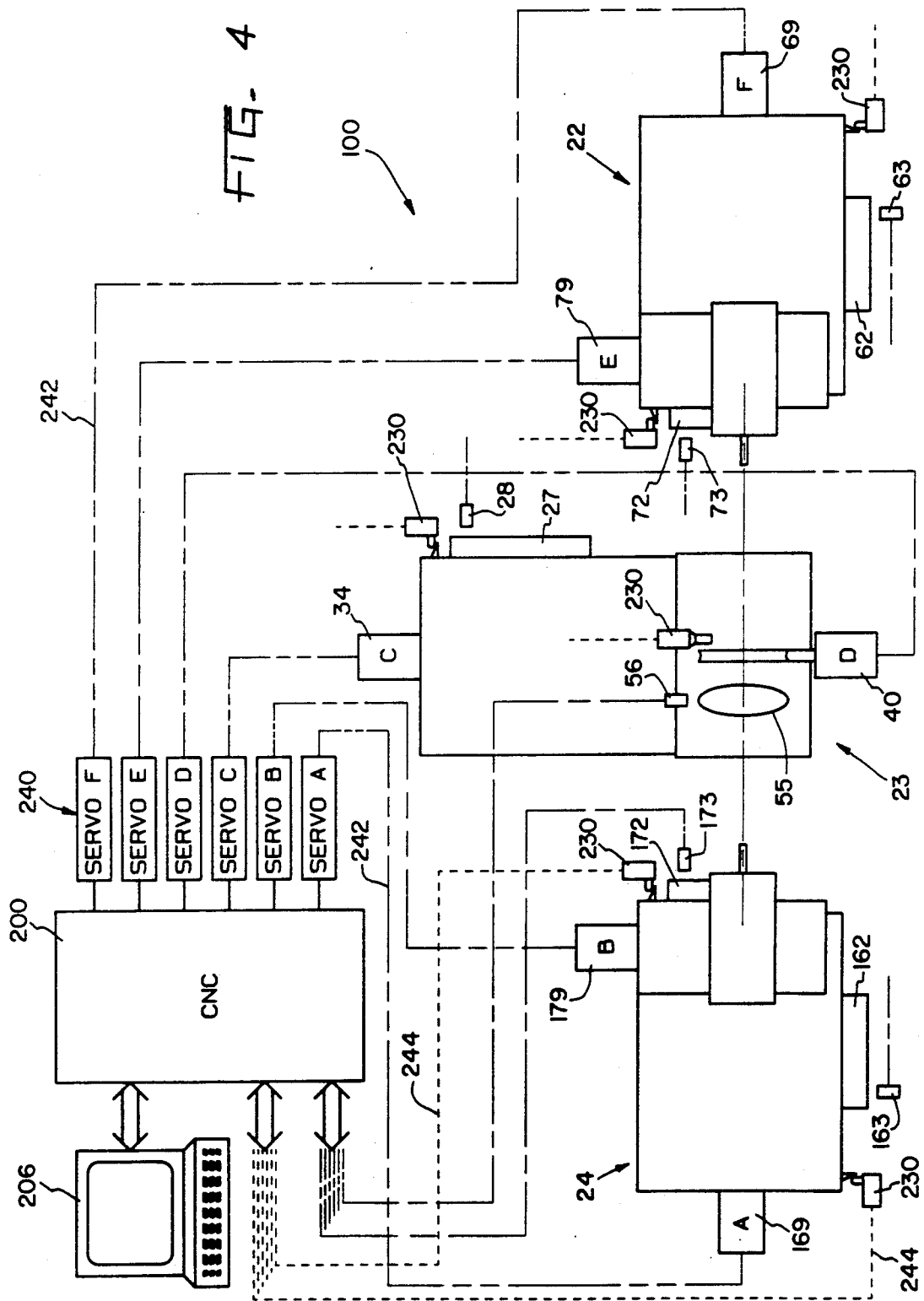
FIG. 4 is a diagrammatic representation of the control system for the scroll machining apparatus.

FIG. 4 shows, in diagrammatic form, a possible control mechanism for the machining apparatus. A numerical machine controller 200, preferably a GE Fanuc Model 15 MA Controller with speed enhancement, is used to accurately control all servo motors and receive feedback from sensors during the milling operation in accordance with known practice. Controller 200 has connected to it a video terminal 206. Other types of numerical machine controllers may be used for machine control.

A bank of servo motor controllers 240 is connected between the numerical machine controller 200 and the servo motors (A-F) in a conventional way. These servo motor controllers 200 control the servo motors (A-F) via control wires 242 represented by a double dashed lines in FIG. 4.

As represented in FIG. 4, servo controllers A and B control the movement of left slide system 24 along ways 161 and 170 by servo motors 169 and 179. Likewise, servo controllers E and F control the movement of right slide system 22 along ways 61 and 70 by servo motors 79 and 69. The center slide and rotary system 23 is moved by servo motors 34 and 40 connected to servo controllers C and D.

Sensors, as shown in FIG. 4, include home-limit switches 230 adjacent all slides, and linear scale readers 28, 63, 73, 163, 173 or rotary scale reader 56 for measuring position. Home-limit switches 230 signal to the controller 200 a position where a slide or arbor should stop. The feedback lines 244 from the home-limit switches 230 back to controller 200 are represented by lines of small dashes. The scale readers, preferably having digital outputs, are used to identify the position of the slides or arbor to controller 200. Feedback lines 246 from scale readers 28, 56, 63, 73, 163, and 173 to controller 200 are shown as single dashed lines in FIG. 4.

Home-limit switches 230 can also be used as markers allowing the controller 200 to determine roughly where a moving part should stop, then controller 200 can use input from the scales for precise adjustment in accordance with general machine control techniques.

Referring to FIG. 6, the wrap circle of the involute form 210 is shown. End mill 186 is shown vertically offset from the wrap circle 210 with centerline 211 of the end mill 186 on a horizontal line tangent to the wrap circle 210. The end mill 186 is also shown tangent to the inside of involute form 54' at point 212 of the orbital scroll 50. This is a unique position of end mill 186 relative to the wrap circle 210 in which a rotation of the scroll combined with a linear translation of the scroll in the following mathematical relation will develop a true involute $$Y = \frac{\pi \alpha D}{360} \text{ therefore } Y = K \alpha$$

where
Y = translation distance of center slide 25
D = wrap circle diameter
α = degrees of rotation $$K = \frac{\pi D}{360}$$

This unique motion also maintains the cutter constantly on the same side of the involute throughout the multiple wrap, thus there is no reversal of the cutting force on spindle 35 and slide 25 nor reversal of the rotation axis, thus without the inaccuracies that accompany slide reversal. The spindle 35 rotates on a rotational axis that extends through the wrap centers of both scrolls 43 and 50.

The end mill 86 in dotted outline is also shown vertically offset from the center of the wrap circle 210 with centerline 211 of the end mills 86, 186 on a horizontal line tangent to the wrap circle 210 (FIG. 6). The end mill 86 is shown tangent to the outside involute form 47' at point 214 of the fixed scroll 43. The same mathematical uniqueness of above applies to this end mill 86.

Figure 13:
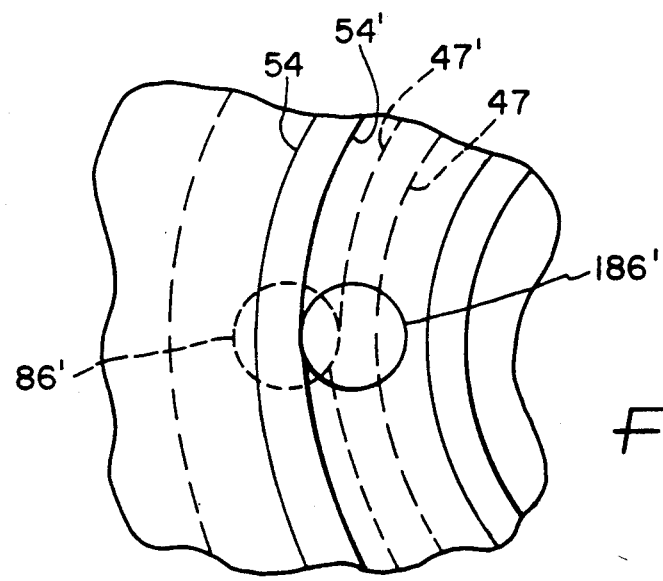
FIG. 13 is an enlarged fragmentary view of the superimposed scroll members of FIG. 7, showing how a random deviation in the machine motion from a true involute form will cause complementary geometries in the fixed and orbiting scroll members that will fit with one another when the scroll members are operably intermeshed in a scroll compressor.
Figure 14:
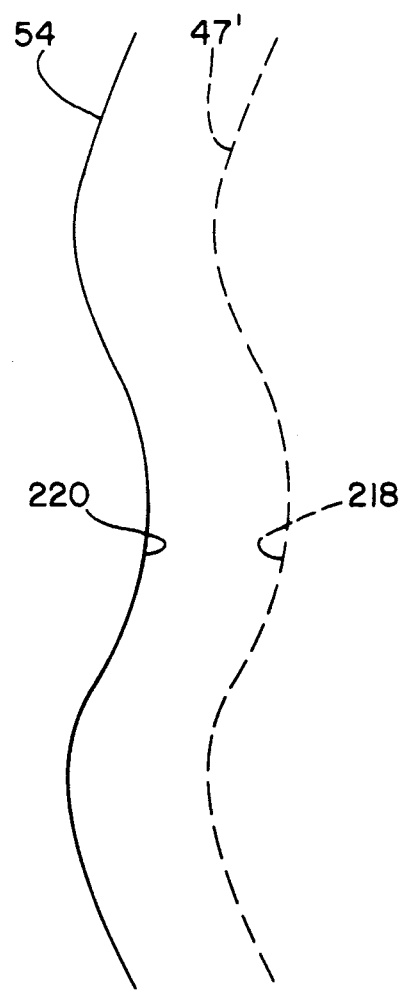
FIG. 14 is an enlarged fragmentary view of the respective radially inner and outer wrap surfaces of the scroll members of FIG. 13, showing the complementary geometries resulting from a deviation in the machining motion from a true involute form.

The outside involute 47' of fixed scroll 43 meshes with the inside involute 54' of orbital scroll 50 on final assembly. Since machine 20 is milling the two meshing involutes simultaneously, should the linear axis Y slow while the milling cut is moving outward away from the wrap circle, thus straying slightly from the mathematic formula $Y = K\alpha$, a dip will occur in the outside involute 47' and since the same linear travel affects the meshing inside involute 54', a rise will occur minimizing the resulting misfit between the two surfaces. End mill position 86', FIG. 13, demonstrates this dip effect 218 combined with compensating rise 220 in the path of the end mill 186', FIG. 14 shows a greatly exaggerated view of the complementary deviations of the scroll members 43 and 50.

The orientation of the orbital scroll involute, 180° out of phase with the fixed scroll involute and on a common centerline, as described above and shown in FIG. 6, is required for this self-correction to occur and in the orientation of the scroll pair when assembled into a compressor.

The general method of milling for each of the scrolls comprises making a straight cut or flat, by moving an end mill linearly, substantially forming a scroll valve at the inner tip of one of the scrolls, then backing the end mills out and rotating the scrolls, then making a plunge cut to mill both scrolls to involute size on both sides, milling the involutes, and then making a straight cut, like the first cut, on the other scroll.

The following describes the milling method applied first to orbiting scroll 50. It is not intended to limit in which order the scrolls are first machined.

Figure 8:
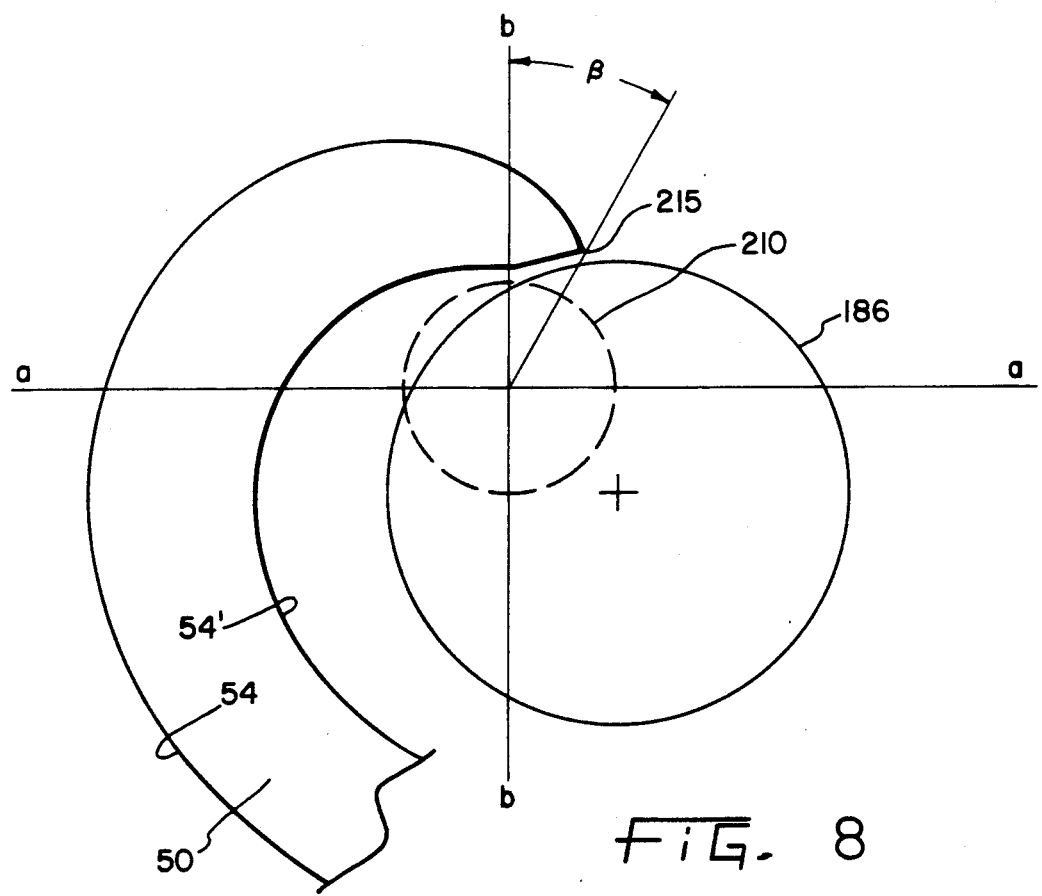
FIG. 8 is an enlarged fragmentary view of the radially innermost point of the involute wrap geometry of the one of the scroll members, showing the scroll member and cutting tool at their initial positions.

Referring to FIG. 8, an enlarged view of the inner point 215 of orbital scroll 50 is shown. This point of the involute orbitally meshes with the fixed scroll involute acting as a valve in the scroll compressor action. Point 215 must be machined acurately for high compressor efficiency. Since the diameter of the milling cutters 86 and 186 vary, especially when reshaped or sharpened, compensation must be made in the machining program. The diameter of milling cutters 86 and 186 may vary depending upon their rate of wear.

Figure 9:
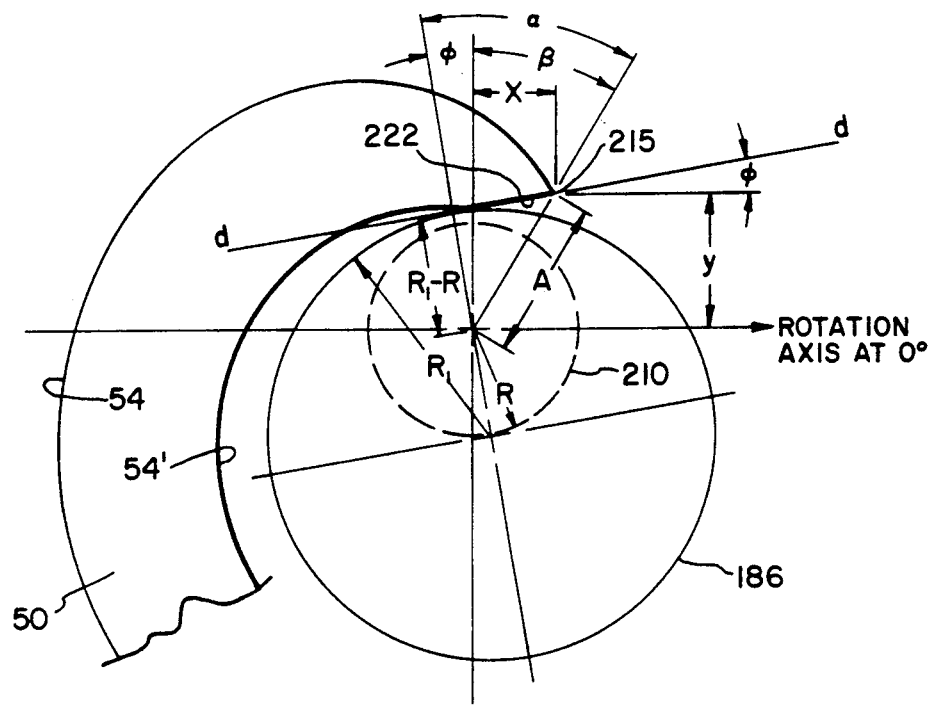
FIG. 9 shows the scroll member of FIG. 8 prior to being rotated clockwise to an angular position whereat linear movement of the cutting tool to the left cuts a flat on the radially outermost tip of the involute wrap geometry which establishes the position of the valve tip.

This machine automatically compensates for milling cutter diameter by rotating the scroll 50 to mill the desired point 215 without changing the programmed linear path of end mill 186. FIG. 9 shows orbiting scroll 50 of FIG. 8 prior to being rotated to an angular position so linear motion of the cutting tool 186 to the left (milling path dd) will cut a flat 222 on the tip 215 of the involute wrap establishing the position of the valve tip. A macro is entered in the computer of the numerical control in a conventional way for calculating and positioning the rotary axis before linear milling of flat 222 occurs.

Lines aa and bb in FIG. 8 are the scroll and rotary axis common centerlines. Rotary axis position for $\phi = 0°$ is shown in FIG. 8. Wrap circle 210 is shown with radius R (see FIG. 9). Dimension A is the distance from the scroll center to the point 215 and is given by the part design (FIG. 9). Both the dimensions X and Y, the distance from point 215 to the scroll axis are given. Angle $\beta$ is given by the part design (FIG. 8). The radius of the milling cutter is $R_1$ and is measured before inserting it into the end mill collet 182. The angle which the scroll must be rotated through for point 215 to intersect milling path of $R_1$ is $\phi$, and is given below.

$$A = (X^2 + Y^2)^{\frac{1}{2}}$$

$$\beta = \text{Arc tan} \frac{X}{Y}$$

$$\alpha = \text{Arc cos} \frac{R_1 - R}{A}$$

$$\phi = \alpha - \beta$$

The variable $R_1$ for a end mill is entered manually in computer memory of the numerical controller. At the necessary point in the scroll program, a conventional macro calls up the mill radius R1, calculates the angle $\phi$ and rotates the rotary axis spindle 35 before making milling pass dd.

The left cross slide 171 provides the control motion for milling pass dd. The outside involute form 54 intersecting the flat 222 will be machined during the milling of the involutes. The inner point 216 of fixed scroll 43 is machined in a similar manner after the involute forms have been machined. The right cross slide 71 provides the motion for this milling pass.

Since the mill cutters 86 and 186 are always tangent to the involute and since their travel is perpendicular to the tangent, compensation for the milling cutter diameter can be accomplished by offsetting cross slides 171 and 71 by the amount that the radius of their respective end mills 186 and 86 vary. The machining program for the center slide 23 is not altered. Main slides 60 and 160 are used to program the depth of cut in the scrolls 43 and 50.

Figure 10:
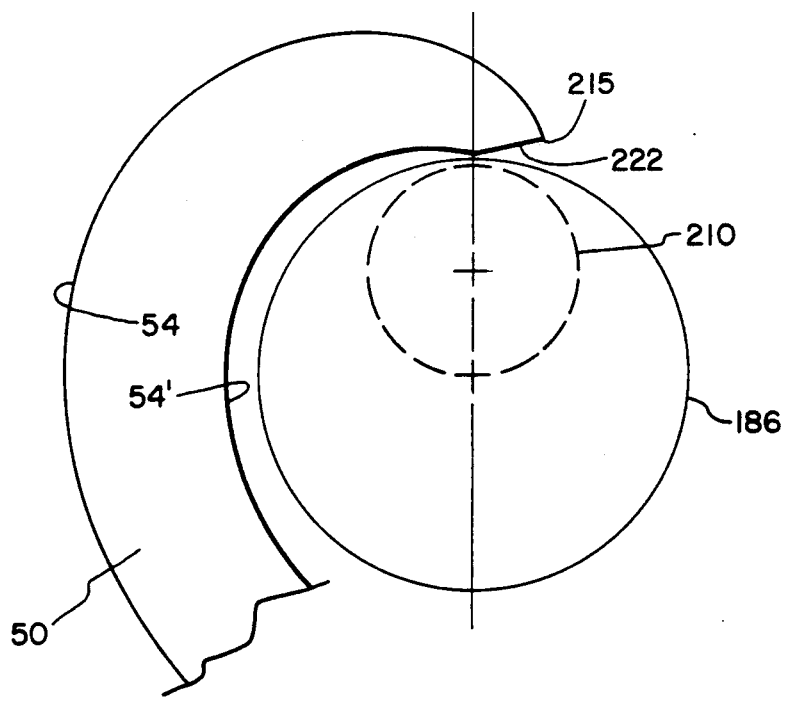
FIG. 10 shows the scroll member of FIG. 9 rotated back counterclockwise to its initial position in preparation for the cutting tool to make its plunge cut.

After the flat 222 is cut into the first scroll, the machine prepares to operate upon the involute portions of the scrolls. FIG. 10 shows the scroll of FIG. 9 rotated back to its initial position in preparation for the cutting tool 186 to make a plunge cut and begin machining the required involute path along corresponding scroll surfaces.

Figure 11:
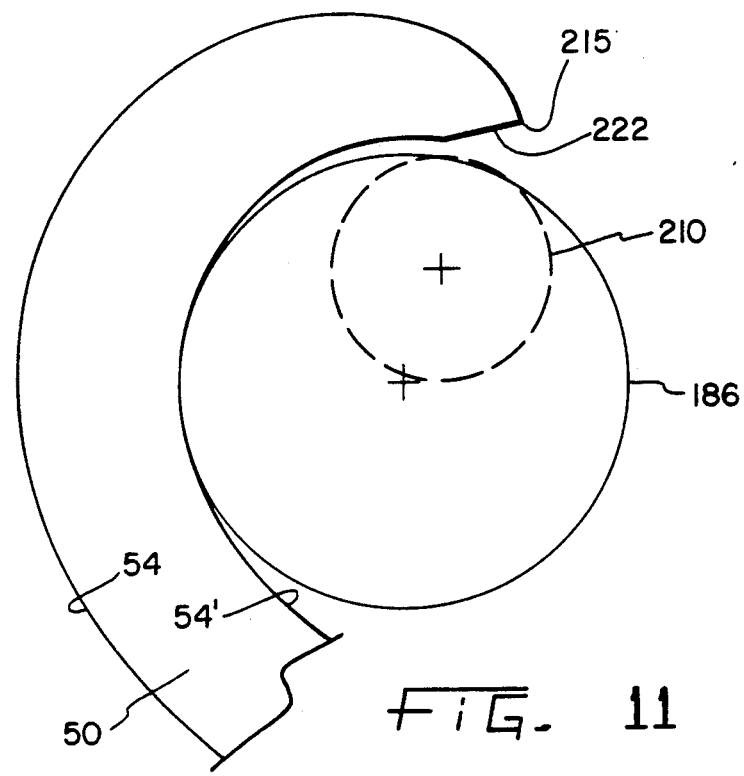
FIG. 11 shows the scroll member of FIG. 10 after the cutting tool has made its plunge cut by moving to the left along its linear path to a position whereat the outer diameter of the tool is tangent with the radially inner wall of the wrap at the desired involute path.
Figure 12:
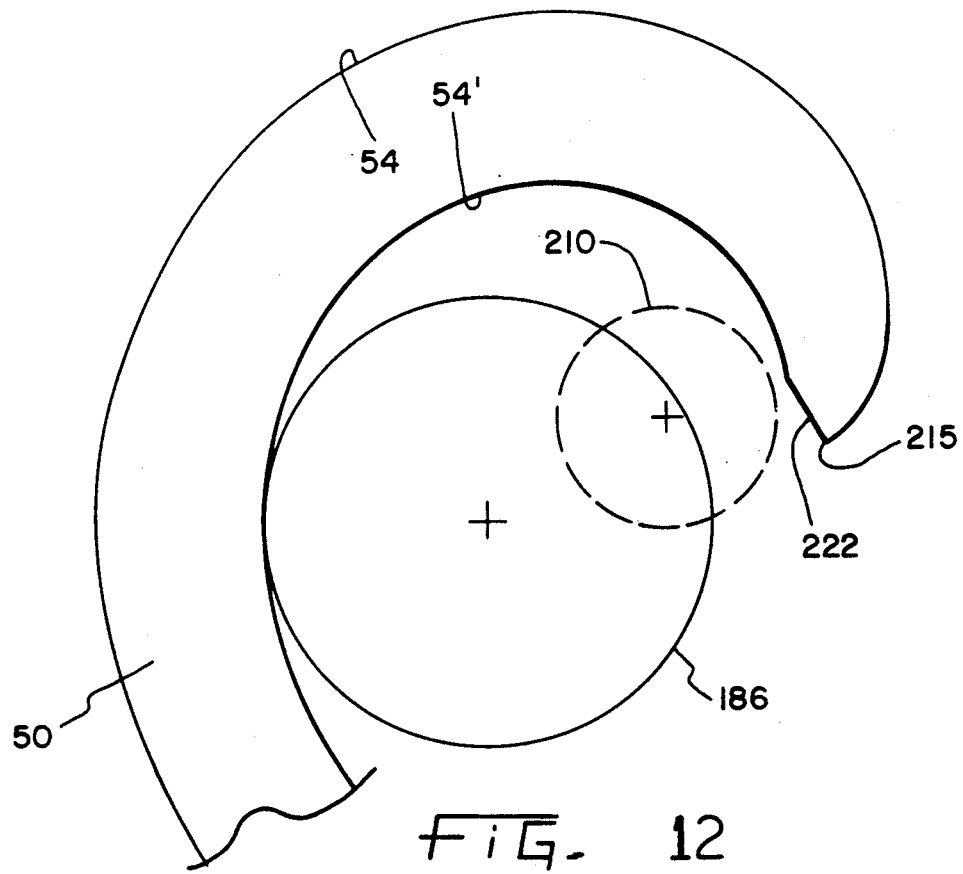
FIG. 12 shows the scroll member of FIG. 11 after the scroll member has begun rotating clockwise and simultaneously moved to the right along its linear path to machine the radially inner surface of the scroll wrap.

After the cutting tools 86 and 186 have made their initial plunge cut by moving to the left along their linear path, the outer diameter of the cutting tool is tangent with the wall of the wrap 54' at the desired involute path (FIG. 11). The cutting tools 86 and 186 are positioned on complementary walls of the orbiting and fixed scroll wraps (FIG. 13). The orbiting and fixed scroll members, 43 and 50, are now rotated and moved in a linear path, keeping the outer diameters of the cutting tools 86 and 186 along the desired involute path along both wraps. FIG. 12 illustrates the orientation after the orbiting scroll has been rotated and the cutting operation begun.

Figure 5:
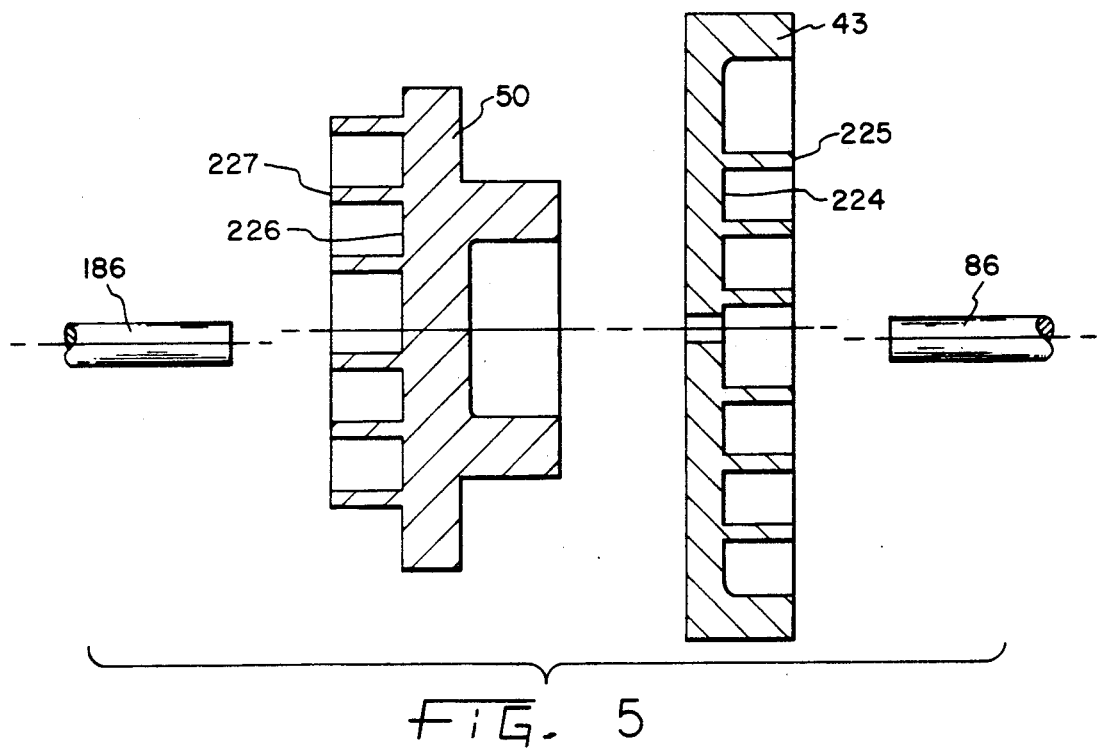
FIG. 5 is an exploded side elevational view of a fixed and orbiting scroll member having their wrap surfaces facing axially outwardly in opposite directions as they would be held by the center spindle of FIG. 3, together with a pair of cutting tools extending axially inwardly toward the scroll members.

It is possible during machining of the involutes that one may vary the axial position of one or both end mills 86 and 186 relative to their respective scrolls to profile the inner scroll plate surfaces 224 and 226. The tips of the scroll wraps 225 and 227 are machined in a separate second pass and may similarly be profiled (FIG. 5).

FIG. 6 shows a view of the fixed and orbiting scrolls 43 and 50 superimposed, with cutting tools 86 and 186 engaging a radially outer wrap surface of one scroll member and a radially inner wrap surface of the other scroll member as the scrolls 43 and 50 rotate and move outward along a linear path.

A near uniform machining feed rate on the periphery of the involute is desirable to control the milling cutter tooth loading and to control the microfinish of the milled surface. As the milling cutter progresses from the innermost portion of the involute to the outermost portion of the involute, the rotation rate must be slowed while still maintaining the relation $Y = K\alpha$ described earlier. Since at the innermost involute, the vector motion of Y is a large portion of the periphery travel, but diminishes relative to the rotary vector of periphery travel as progression outward occurs, the rate at which the feed rate must be reduced is not a linear function of either Y or $\alpha$.

It can be shown that a very near constant feed rate for milling of the involutes can be obtained by ramping the feed rate to a formula having the following form:

$$\text{Feed Rate} = C[D/(\alpha + E)]$$

Where
C = Basic Feed Rate
D = Factor depending on scroll design
$\alpha$ = Rotary position of involute
E = Factor depending on scroll design Factors D and E are determined for the particular scroll design and are entered in the computer portion of the controller along with the formulae. While machining the involute, the feed rate is under control by the above formulae and updates the feed rate as the rotary position of o increases or decreases.

If desired, the thickness of the wraps may be tapered in a circumferential direction by the machining operation. Lateral movement of end mills 86 or 186 during milling would make the scroll walls thicker or thinner.

To machine the opposite sides 54 and 47 of the orbital scroll and fixed scroll, respectively, the left cross slide 171 repositions end mill 186 to a position outside involute 54 and the right cross slide repositions end mill 86 to a position inside involute 47.

In this case machining begins at the outer extremity of the involute, rotation of rotary axis 35 is reversed and the machining proceeds from outer extremity of the involute to the inner extremity. FIG. 7 shows the cutting tools 86 and 186 engaging the opposite sides of their respective wrap surfaces from those shown in FIG. 6. With this arrangement, climb milling can be accomplished in both faces of the involute form, without reversing the motorized spindles 80, 180 nor the end mills 86, 186.

After the milling of the involute form has been completed the next operation is to mill the flat upon the fixed scroll 43 to complete the necessary scroll valve using the same technique as described above.

Upon completion of milling, the end mills 86 and 186 are retracted clear of scrolls 43 and 50, and center slide 25 moves forward to phantom positions 43' and 50' to allow an operator to remove the milled scrolls 43 and 50 and load another scroll pair.

Alternatively, the milling apparatus could comprise a central unit having a common spindle and including the motor driven cutting tools that are axially aligned and face in opposite directions outwardly from the central spindle unit. The central unit could include a cam mechanism to control the motions and could be driven by a single source. The scroll components would be mounted on each of two rotating spindle units located on opposite ends of the main spindle. The end units would also have only axial and in and out motion capability, and the central spindle unit would rotate the cutters and would have rotational and linear travel to generate the scroll geometry. The end units would clamp the mating fixed and orbiting scroll components to hold them in a fixed position while the center spindle unit machines the scroll forms. Although a computer numerical control drive mechanism is preferred, a cam controlled mechanism could be utilized.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for machining the respective involute wrap faces of a complementary pair of fixed and orbiting scroll members for use in a scroll compressor, comprising:
    center spindle means for holding the fixed and orbiting scroll members in generally axially aligned positions such that the involute wrap faces of the fixed and orbiting scroll members face axially outwardly in opposite directions;
    a pair of tool menas having respective axially inwardly facing cutting tools adapted to respectively machine the involute wrap faces of the fixed and orbiting scroll members; and
    means for controlling relative movement of said center spindle means and said pair of tool means to enable simultaneous machining of the involute wrap faces of the fixed and orbiting scroll members.

2. The apparatus of claim 1 in which said center spindle means holds the fixed and orbiting scroll members in fixed positions relative one another, said spindle being capable of rotating about a rotational axis extending through the respective wrap centers of the fixed and orbiting scroll members in response to said controlling means.

3. The apparatus of claim 2 in which said pair of tool means are capable of moving linearly along respective axes perpendicular to said rotational axis in response to said controlling means.

4. The apparatus of claim 1 in which said pair of tool means are positioned relative one another during movement along respective axes such that the respective axes of said cutting tools are offset a constant distance dependent upon the respective diameters of said cutting tools.

5. The apparatus of claim 2 in which said center spindle means is capable of moving linearly along an axis perpendicular to said pair of tool means in response to said controlling means.

6. The apparatus of claim 1 in which said pair of tool means are respectively mounted on a pair of two-slide platforms wherein said pair of tool means are movable in respective generally parallel planes such that the respective axes of said cutting tools remain parallel.

7. The apparatus of claim 1 in which said center spindle means is mounted on a slide platform capable of moving said spindle means along an axis generally perpendicular to said respective axes of said cutting tools.

8. The apparatus of claim 1 in which said center spindle means includes selectively actuated gripping means for holding the fixed and orbiting scroll members during a machining operation.

9. A method of machining the respective involute wrap faces of a complementary pair of fixed and orbiting scroll members for use in a scroll compressor, comprising the steps of:
    holding the fixed and orbiting scroll members in fixed relationship to one another such that they are axially aligned and their respective involute wrap faces face in axially opposite directions;
    engaging the involute wrap faces of the fixed and orbiting scroll members with a respective pair of cutting tools, each of said pair of cutting tools facing a respective involute wrap face of the fixed and orbiting scroll members; and
    simultaneously rotating the fixed and orbiting scroll members and causing relative linear movement of said pair of cutting tools and the fixed and orbiting scroll members.

10. The method of claim 9 in which said relative linear movement of said pair of cutting tools and the fixed and orbiting scroll members is caused by moving said fixed and orbiting scroll members linearly.

11. The method of claim 9 in which said pair of cutting tools rotate about respective parallel axes, said axes being offset from each other a distance dependent upon the respective diameters of said cutting tools.

12. The method of claim 9 in which one of said pair of cutting tools cuts the radially inner surface of the involute wrap of one of the fixed and orbiting scroll members, while the other of said pair of cutting tools simultaneously cuts the radially outer surface of the involute wrap of the other of the fixed and orbiting scroll members.

13. A matched scroll member pair having respective predetermined involute wrap geometries that seal along a radially inwardly moving sealing line of contact when said scroll member pair are operably intermeshed and one scroll member is orbited relative the other, wherein random deviations from said respective predetermined involute wrap geometries are complementary, thereby enhancing the seal between the scroll members, said matched scroll member pair being manufactured by a process comprising the steps of:
    holding said scroll member pair in respective generally axially aligned positions such that respective wrap surfaces of said scroll member pair face in axially opposite directions;
    engaging said wrap surfaces of said scroll member pair with a respective pair of cutting tools, each of said pair of cutting tools facing a respective wrap surface of said scroll member pair; and
    moving said scroll member pair and said pair of cutting tools relative one another to simultaneously cut said predetermined involute wrap geometry in each of said scroll member pair, such that throughout said relative movement said pair of cutting tools simultaneously engage respective portions of said wrap surfaces of said scroll member pair that form said radially inwardly moving line of contact when said scroll member pair are operably engaged.

14. A method of machining the respective involute wrap faces of a scroll for use in a scroll compressor, wherein the involute wrap geometry is generally formed by the combined linear travel of a cutting tool and rotational and linear movement of the scroll member, the scroll member being rotated about the center of a wrap circle generally defining the involute wrap geometry and the cutting tool being moved relatively linearly comprising the steps of:

moving the scroll member to an angular position dependent upon the desired location of an inner valve tip of the involute wrap and the diameter of the cutting tool while the cutting tool remains out of cutting engagement with said scroll member;

moving the cutting tool linearly into cutting engagement with the involute wrap while said scroll member remains stationary in a rotational sense, thereby forming a flat surface between an inner wall and an outer wall of the involute wrap;

machining the desired involute into respective involute wrap faces of said scroll member; and machining an outer wall of the involute wrap such that an intersection of the machined outer wall and the flat surface defines the radially innermost valve tip of the involute wrap of said scroll member.

15. The method of claim 14 in which the machining of the desired involute comprises:

moving said scroll member to a position where said cutting tool may make a linear plunge cut to the desired involute form;

making an linear plunge cut with said cutting tool engaging the involute wrap face of said scroll; and then simultaneously rotating said scroll member and causing relative linear movement of said cutting tool and said scroll member to cut the involute form on said inner wall of said scroll.

16. The method of claim 15 in which the machining of the desired involute comprises subsequently reversing the rotation and the linear travel of said scroll to cut the involute form on said outer wall of said scroll.

17. An apparatus for machining a matched scroll member pair having respective predetermined involute wrap geometries that seal along a radially inwardly moving sealing line of contact when said scroll member pair are operably intermeshed and one scroll member is orbited relative the other, wherein random deviations from said respective predetermined involute wrap geometries are complementary, thereby enhancing the seal between the scroll members, said apparatus comprising:

means for engaging said wrap surfaces of said scroll member pair with a respective pair of cutting tools, each of said pair of cutting tools facing a respective wrap surface of said scroll member pair; and means for moving said scroll member pair and said pair of cutting tools relative one another to simultaneously cut said predetermined involute wrap geometry in each of said scroll member pair, such that throughout said relative movement said pair of cutting tools simultaneously engage respective portions of said wrap surfaces of said scroll member pair that form said radially inwardly moving line of contact when said scroll member pair are operably engaged, whereby random deviations from said respective predetermined involute wrap geometries are complementary.

18. A method for machining a matched scroll member pair having respective predetermined involute wrap geometries that seal along a radially inwardly moving sealing line of contact when said scroll member pair are operably intermeshed and one scroll member is orbited relative the other, wherein random deviations from said respective predetermined involute wrap geometries are complementary, thereby enhancing the seal between the scroll members, said method comprising the steps of:

engaging said wrap surfaces of said scroll member pair with a respective pair of cutting tools, each of said pair of cutting tools facing a respective wrap surface of said scroll member pair; and means for moving said scroll member pair and said pair of cutting tools relative one another to simultaneously cut said predetermined involute wrap geometry in each of said scroll member pair, such that throughout said relative movement said pair of cutting tools simultaneously engage respective portions of said wrap surfaces of said scroll member pair that form said radially inwardly moving line of contact when said scroll member pair are operably engaged, whereby random deviations from said respective predetermined involute wrap geometries are complementary 19. The method of claim 18 further comprising the step of varying the axial position of each cutting tool relative a respective scroll member to profile an inner scroll plate surface.

* * * * *